C. C. HARBRIDGE.
DEMOUNTABLE RIM.
APPLICATION FILED NOV. 19, 1913.
1,154,629.
Patented Sept. 28, 1915.
2 SHEETS—SHEET 1.
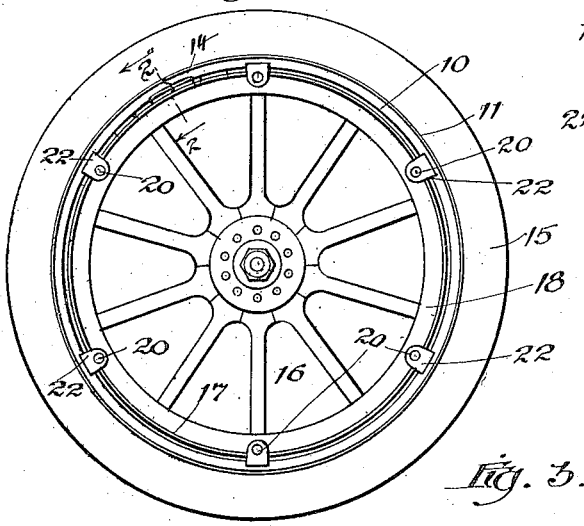
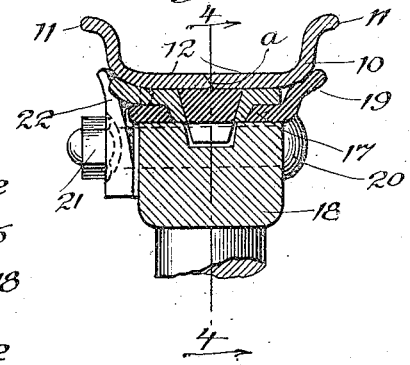
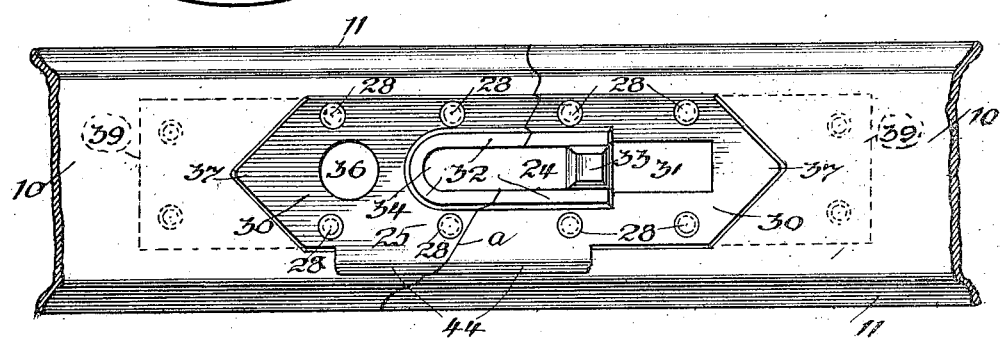
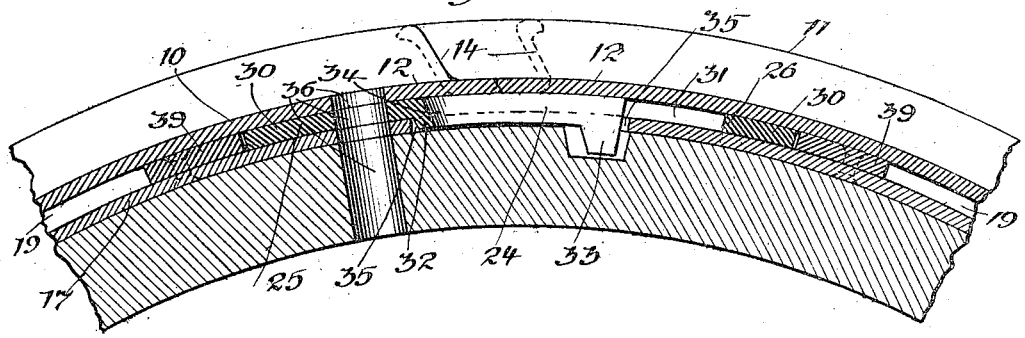
Witnesses:
Frank Blanchard
Mildred Stumpf
Inventor:
Chester C. Harbridge
By Fred Gerlach
His Attorney

C. C. HARBRIDGE.
DEMOUNTABLE RIM.
APPLICATION FILED NOV. 19, 1913.

1,154,629.

Patented Sept. 28, 1915.
2 SHEETS—SHEET 2.

Witnesses:
Frank B. Blanchard
Mildred Stumpf

Inventor:
Chester C. Harbridge
By Fred Gerlach
His Attorney.

UNITED STATES PATENT OFFICE.

CHESTER C. HARBRIDGE, OF DETROIT, MICHIGAN, ASSIGNOR TO DETROIT DEMOUNTABLE RIM CO., OF DETROIT, MICHIGAN, A CORPORATION OF MICHIGAN.

DEMOUNTABLE RIM.

1,154,629.

Specification of Letters Patent.    Patented Sept. 28, 1915.

Application filed November 19, 1913. Serial No. 801,734.

*To all whom it may concern:*

Be it known that I, CHESTER C. HARBRIDGE, a resident of Detroit, in the county of Wayne and State of Michigan, have invented certain new and useful Improvements in Demountable Rims, of which the following is a full, clear, and exact description.

The invention relates to demountable rims and more particularly to that type in which the tire-holding rim is split transversely to permit flexure of the rim within the tire and to facilitate placement of a tire on the rim and its removal therefrom.

The invention designs to provide improved locking means for securing the ends of the split rim in exact registry and also improved locking-means between the split rim and a fixed band on the wheel.

The invention consists in the several novel features hereinafter set forth and more particularly defined by claims at the conclusion hereof.

Figure 5:
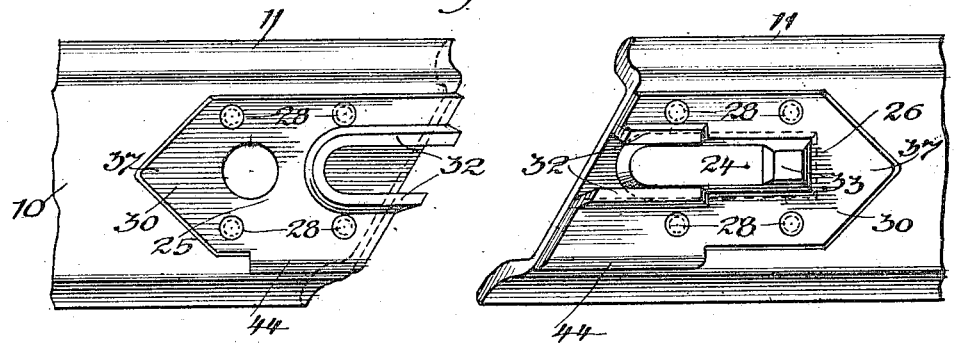
Figure 6:
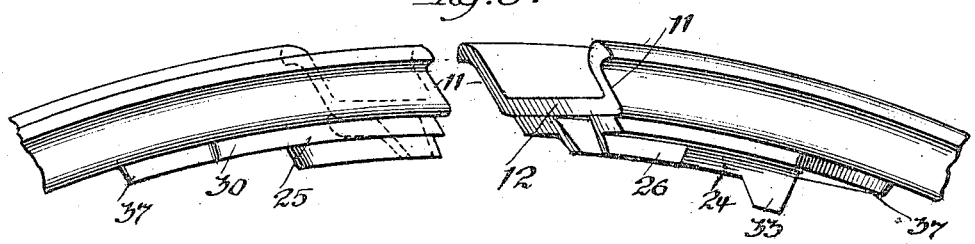
Figure 7:
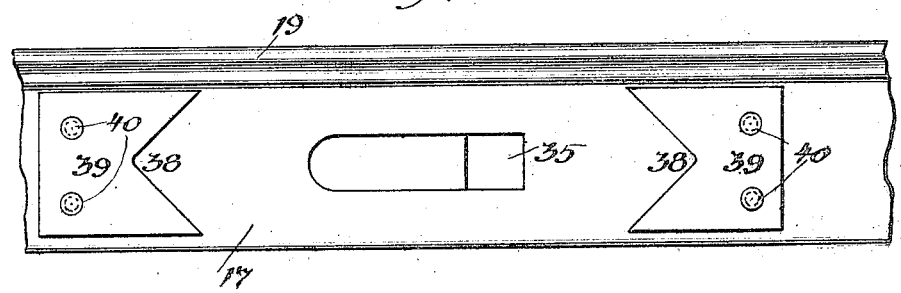

In the drawings: Figure 1 is a side elevation of a wheel embodying the invention. Fig. 2 is a section taken on line 2—2 of Fig. 1. Fig. 3 is a plan of a portion of the demountable rim and the locking device applied to the inner face thereof. Fig. 4 is a section taken on line 4—4 of Fig. 2. Fig. 5 is a plan similar to Fig. 3 but showing the rim ends spread apart. Fig. 6 is a side elevation of the parts as shown in Fig. 5. Fig. 7 is a plan view of a portion of the felly band.

The improved demountable rim 10 is formed with integral tire-holding flanges 11 and a base portion 12. The rim is split diagonally in transverse direction and is also split at an angle to the radius or undercut, as at 14, to permit one end to be flexed inwardly and laterally in placing a tire on the rim or in removing it therefrom. By employing an undercut, pressure upon the outside of the tire to contract the rim will cause one end of the rim to slide upon the other or contiguous end and thus tend to work the rim loose from the tire. The rim 10 is adapted to carry a pneumatic tire 15 of usual construction.

The demountable rim 10 is adapted to be placed on a wheel 16 which comprises a band 17 which is rigidly secured to the felly 18 of the wheel and has a flange 19 at one side thereof upon which the rim is adapted to seat. Bolts 20 are secured in the felly, and nuts 21 engaging screws on said bolts are adapted to engage wedge-lugs 22 which bear against one side of and under the rim to removably secure the rim upon its seat 19 and upon the wheel. These bolts, nuts and lugs may be of any suitable construction, as well understood in the art.

In practice, it has been found desirable that efficient means be provided for securing the ends of a split rim in accurate registry, so as to avoid any cutting of the tire by one of the ends, and this is particularly important when the rim is split diagonally to facilitate the flexing of one end of the rim. For this purpose, a slidable bolt 24 and a bolt-guide, which comprises members 25 and 26 secured to the ends, respectively, are provided. In manufacturing the demountable rim, bolt-guide is secured to the base 12 of the rim by rivets 28 before the rim has been split. After the guide has been secured to the rim in this manner, the rim and guide are both cut or sawed diagonally and angularly, so that the contiguous edges of the rim and the guide-members 25 and 26 will have faces inclined laterally and inclined angularly or undercut, so that they will, when held together, form a smooth joint and so that the contiguous ends of the guide will be conterminous with the rim ends. The bolt guide and each of the members thereof comprise a plate portion 30 which is adapted to fit between the wheel-band 17 and the inner face of the rim 10. A longitudinally extending slot 31 is formed in bolt-guide and each of the members is provided with a flange 32 between which the locking-bolt 24 is adapted to slide. The flanges 32 extend inwardly from plate-portions 30 to form a wide bearing for the guide-surface for the bolt 24, so that the rim ends, as well as the contiguous ends of guide-members 25, 26 will be held against relative lateral movement. Bolt 24 is flared outwardly or dovetailed, and the bearing surfaces for the bolt on flanges 32 are correspondingly formed to hold bolt 24 in the guide and to cause the bolt to secure the rim ends and contiguous ends of the guide-members in accurate vertical registry, the bolt fitting snugly in the way formed between flanges 32 and against the inner face of the base 12 of the rim. A lug 33 is formed on bolt 24 whereby the latter may be driven into and out of one of the guide-members. One end of bolt 24 is tapered, as at 34, to facilitate its entry into one of the guide-members in locking the rim together and the flange 32 on guide-member 25 is correspondingly formed to receive the end of the bolt. A slot 35 is formed in the wheel-band 17 to receive the flanges 32 of the bolt-guide and the lug 33 on the bolt. A hole 36 is formed in base 12 on the rim, guide-member 25, the wheel-band 17 and the felly 18, for the usual tire valve.

The outer end of each of the guide-members 25, 26 is V-shaped, as at 37, to enter a correspondingly shaped recess 38 formed respectively on plates 39, which are riveted, as at 40 to the wheel-band 17. When the rim is on the wheel, the V-shaped ends 37, of the guide fitting into the V-shaped recesses of plates 39, will lock the rim-ends against separation, and will also secure the rim against lateral movement on the wheel adjacent the split in the rim. Plates 39 fit in the space between the band 17 and the base 12 of the rim. Guide 24 is extended laterally, as at 44, to additionally support and provide a bearing for that side-portion of the rim, which is outwardly disposed or overhangs the felly-band, and this is important because it secures the side-portion of the rim adjacent the split. The plate-portion 30 of guide-members 25 and 26 bear on the band 17 when the rim is on the wheel to support the rim ends.

When the rim ends and bolt are in position illustrated in Fig. 2 of the drawings, the rim ends will be securely locked together against relative lateral or vertical movement by the bolt, and the rim ends may be accurately alined, both laterally and radially to prevent any cutting of the tire by the rim ends. The dovetailed connection between the bolt and the guide-members secures the base-portion of the rim ends, so that they will be flush. When a tire is to be placed on, or removed from, the rim, bolt 24 will be driven longitudinally, which may be conveniently done by the blow of a hammer on lug 33, so that it will pass entirely into the guide-member 27, as shown in Fig. 5. The end of the rim to which guide-member 26 is secured may then be flexed inwardly and laterally. If the tire is to be placed on the rim, one of its ends may be placed in position in the tire and the other end sprung inwardly or contracted to bring the tire-holding flanges at the sides of the tire; and when released, it will spring into place around the tire. When the tire has been placed on the rim, bolt 24 will be driven to span the split between the guide-members and the rim-ends and driven into guide-members 26, so it will secure the guide-members and rim ends together. To separate the rim from the tire, it is only necessary to drive bolt 24 completely into guide-member 26 and then one end of the rim will be free to be sprung inwardly and laterally. To place the rim with the tire thereon upon the wheel, the rim will be tilted at an angle to the wheel and the valve-stem will be inserted through hole 36. The V-shaped ends 37 of the guide will then be in a position to pass into the V-shaped recesses of plates 39 on the wheel-band as the rim is tilted laterally into position around the band. This interlocking of the ends of guide 24 and plates 39 will secure the rim against rotation relatively to the wedge-lugs 22, which will then be forced into position to secure the rim on the band by nuts 21.

The invention thus exemplifies improved locking means for the ends of the split rim whereby they will be held in accurate registry to prevent cutting of the tire and also improved means for locking the rim against rotation of the wheel.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. The combination of a demountable tire rim, which is split transversely at one point, so that its ends may be flexed, a guide on the inner face and extending longitudinally of the rim, having members secured to said ends respectively, and a slide movable longitudinally of the rim in both of said members for securing the rim ends against relative lateral movement.

2. The combination of a demountable tire rim, which is split diagonally and transversely at one point, so that its ends may be flexed, a guide on the inner face and extending longitudinally of the rim, having members secured to said ends respectively, and a slide movable longitudinally in both of said members to secure the rim ends against relative lateral movement, the guide-members having diagonal ends conterminous with the rim ends.

3. The combination with a wheel-body comprising a band having a slot therein, of a demountable rim having integral tire-holding flanges, and which is split transversely at one point, so that its ends may be flexed, a guide extending longitudinally of the rim and extended inwardly to pass into the slot in the band having members secured to said ends and having a way or slot therein, and a slide fitting and movable longitudinally in said way or slot in the guide to secure the rim ends against relative lateral movement.

4. The combination of a demountable tire rim, provided with tire-holding flanges and which is split transversely at one point, so that its ends may be flexed, a guide on the inner face and extending longitudinally of the rim, comprising members secured to said ends respectively, and a slide fitting and movable longitudinally in said members to secure the rim ends against relative lateral movement, said slide and members being interfitting to secure the rim-ends against relative radial movement.

5. The combination of a demountable rim which is split diagonally and transversely at one point, so that its ends may be flexed, a guide on the inner face and extending longitudinally of the rim, comprising members secured to said ends respectively, and a slide fitting and movable longitudinally in both of said members to secure the rim ends against relative lateral movement, said members and slide being interfitting to secure the rim ends against relative radial movement, the contiguous ends of said members being conterminous with the rim ends.

6. The combination of a demountable rim, having integral tire-holding flanges and which is split transversely at one point, so that its ends may be flexed, guide-members on the inner face and extending longitudinally of the rim, each member being secured to one end of the rim and forming a way on the inner face of the rim and a slide fitting between the sections and slidable longitudinally in both of said members to secure the rim ends against relative lateral movement.

7. The combination of a demountable tire rim, having integral tire-holding flanges and which is split transversely at one point, so that its ends may be flexed, guide-members on the inner face and extending longitudinally of the rim, each member being secured to one end of the rim and forming a way on the inner face of the rim, a slide fitting between the sections and slidable longitudinally in both of said members to secure the rim ends against relative lateral movement, said slide and sections being interfitting to lock the rim ends against relative radial movement.

8. The combination of a demountable tire rim, having integral tire-holding flanges and which is split transversely at one point, so that its ends may be flexed, guide-members on the inner face of the rim, secured to said ends respectively, and a lock fitting and slidable longitudinally in both of said members to secure the rim ends against relative lateral movement, said lock and members having dovetailed surfaces to secure the rim ends against relative radial movement.

9. The combination with a wheel-body, comprising a band, of a demountable tire rim having integral tire-holding flanges and which is split transversely at one point, so that its ends may be flexed and formed to leave a space around the band, guide-members secured to said ends respectively, and extending longitudinally of the rim and a lock fitting and slidable longitudinally in both of said members to secure the rim ends against relative lateral movement, said members comprising plate-portions on the inner face of the rim and fitting between said face and the outer face of the wheel band and guide-flanges.

10. The combination with a wheel-body, comprising a band, of a demountable tire-rim which is provided with integral tire-holding flanges and which is split transversely at one point, so that its ends may be flexed, and formed to leave a space around the band, guide-members on said ends, respectively, and extending longitudinally of the rim and a lock fitting and slidable longitudinally in both of said members to secure the rim ends against relative lateral movement, said band having a longitudinally extending slot therein, the members comprising plate-portions fitting between the rim and the band and flanges adapted to extend into said slot in the band.

11. The combination with a wheel-body comprising a band, of a demountable tire rim which is split transversely at one point so that its ends may be flexed, a guide on the inner face of the rim having members secured to said ends respectively, a lock slidable in said members to secure the rim-ends together and bearing-plates on the band, disposed at the outer ends of said guide-members, said members and plates having interfitting ends to secure the guide-members against lateral movement on the band.

12. The combination of a demountable tire rim, which is split transversely at one point, so that its ends may be flexed, a guide on the inner face and extending longitudinally of the rim having members secured to said ends respectively, a lock fitting in and slidable in both of said members and an inwardly projecting lug on said slide.

13. The combination of a demountable tire rim which is split at one point so that its ends may be flexed, a plate secured to the inner face of the rim, having members secured to said ends respectively, means for locking the rim ends together, and a wheel having a band thereon, which has one side disposed inwardly of the side of the rim, said plate bearing on the band and being extended outwardly of the band to support the projecting side-portions of the rim.

14. The combination of a demountable tire rim, which is split at one point so that its ends may be flexed, a plate secured to the inner face of the rim, having members secured to said ends respectively, means for locking the rim ends together, and a wheel having a band thereon extended at one side to form an annular seat for one side of the rim, and having its other side disposed inwardly of the adjacent side of the rim, said plate bearing on the band and being extended outwardly of the band at the latter side of the rim to support the side of the rim projecting beyond the band.

CHESTER C. HARBRIDGE.

Witnesses:
MILDRED STUMPF,
ETHEL GERLACH.

Copies of this patent may be obtained for five cents each, by addressing the "Commissioner of Patents, Washington, D. C."